April 30, 1940.  W. A. MEYER  2,199,362
ADJUSTABLE DIAMETER SHEAVE
Filed Jan. 27, 1939

Inventor
W. A. Meyer
by
Attorney

Patented Apr. 30, 1940

2,199,362

UNITED STATES PATENT OFFICE 2,199,362

ADJUSTABLE DIAMETER SHEAVE

Walter A. Meyer, Milwaukee, Wis., assignor to Allis-Chalmers Manufacturing Company, Milwaukee, Wis., a corporation of Delaware Application January 27, 1939, Serial No. 253,068

11 Claims. (Cl. 74—230.17)

This invention relates to V-groove sheaves of adjustable diameter in which the diameter may be varied over a wide range, and is applicable to single-groove and multiple-groove sheaves.

An object of this invention is to provide a simple, inexpensive V-belt sheave which is susceptible of affording a wide variation in effective diameter.

A more specific object of this invention is to provide a sheave, each of the V-grooves of which (if there is more than one groove) is formed by two relatively movable conical disks, one of said disks having a relatively long conical surface on one side thereof, while the other disk is reversible relative to the first and provided with a conical surface on each side, the conical surface on one side of said second disk being cooperable with one portion of the conical surface of the first disk to provide a variable diameter sheave having a given range of diameter variation; while the other side of said disk is cooperable with another portion of the conical surface of the first disk to provide a variable diameter sheave having a different range of diameter variation.

Other objects of this invention will become evident from the following description and illustrations of a preferred embodiment of the invention.

In the accompanying drawing, Fig. 1 shows an intermediate setting of a preferred form of single groove sheave made in accordance with this invention.

Figure 1:
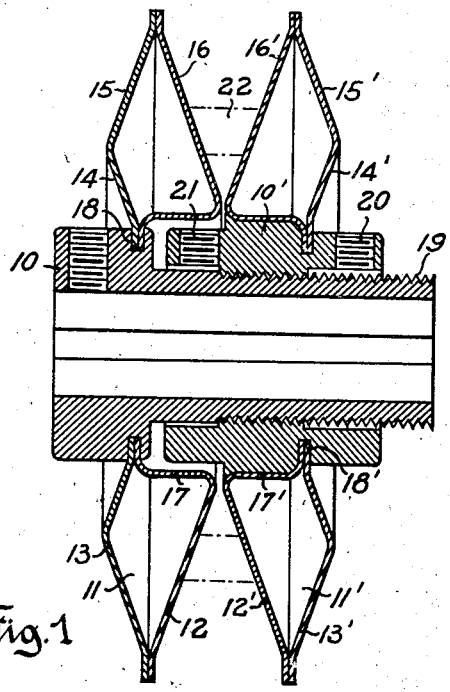

In the embodiment illustrated, a hub 10 supports a disk 11 fixed thereon, in this specific example the disk being cast into the hub at an enlarged portion of the hub. One end of the hub may be threaded as shown at 19, and an internally threaded collar 10' is adjustably and reversibly mounted on the threaded portion of the hub. It is obvious that the collar may be mounted on the hub by any known means other than the screw threads shown.

A second disk 11' is cast into the collar 10' or otherwise fixed thereon. While these disks 11 and 11' may be of solid cast iron, they are illustrated as being each made of a pair of pressed metal plates 12, 13 and 12', 13'. The plates 12, 12' extend cylindrically in an axial direction from the inner edges, as shown at 17, 17', and then turn radially outward and axially in a reversed direction forming conical surfaces 16, 16'. The other plates 13, 13' abut the fixed disks 12, 12' at their inner edges, and extend radially outward and axially outward, as shown at 14, 14' and at an intermediate point reverse their direction, thereby forming the conical surface 15, 15'. The plates 12, 13 and 12', 13' may be welded together at their peripheries.

Figure 2:
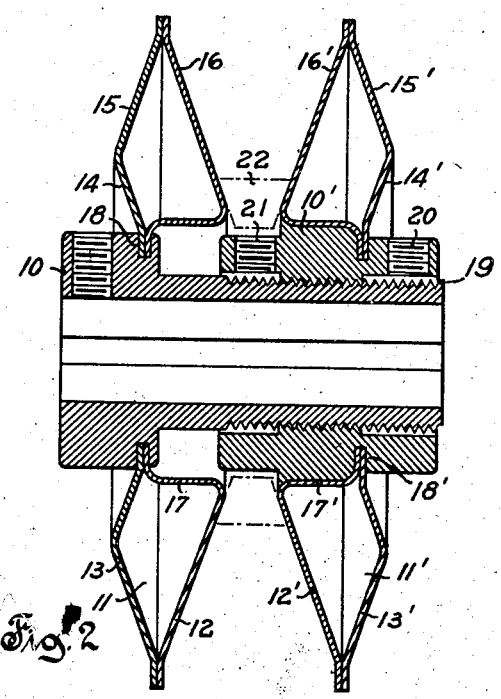
Fig. 2 shows the construction of Fig. 1 with the disks separated to provide a minimum effective diameter.

It will be noted that when the two large conical surfaces 16, 16' coact with each other, as shown in Figs. 1 and 2, the V-belt 22 driving or driven by said pulley may assume a position anywhere between the intermediate effective diameter shown in Fig. 1 and the minimum effective diameter shown in Fig. 2. The collar 10' extends axially on either side of disk 11', and is provided with a set-screw 20 and 21 on each side thereof, one of which is always accessible for fastening the disk 11' in any desired position with respect to disk 11. The cylindrical portion 17 of disk 11 provides an annular recess between the disk 11 and hub 10 which accommodates either of the extensions of collar 10', as clearly shown in Figs. 1 and 3.

Figure 3:
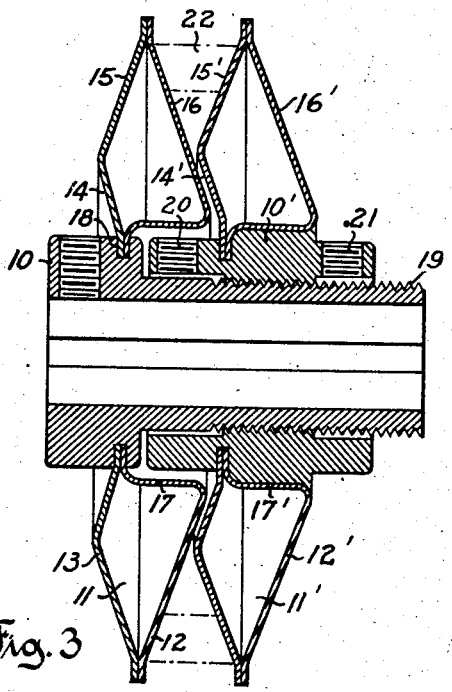
Fig. 3 shows the sheave of Fig. 1 with one of the disks reversed to provide a maximum effective diameter.
Figure 4:
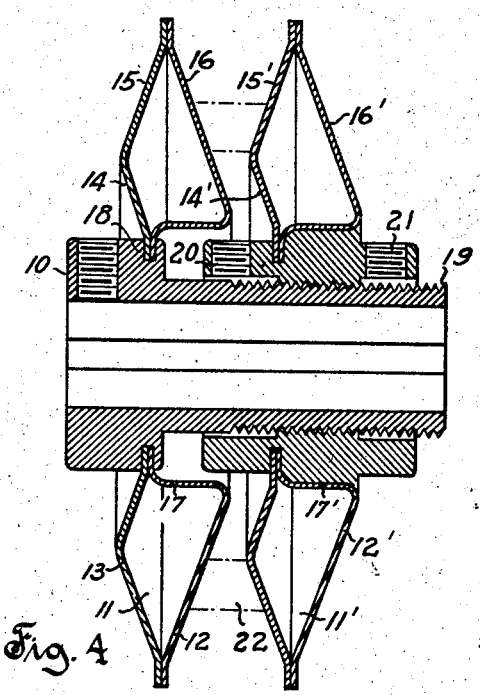
Fig. 4 is similar to Fig. 3 but shows the disks separated to provide an intermediate effective diameter.

To obtain a greater range of diameter than is possible with the arrangement of Figs. 1 and 2, it is necessary merely to reverse the disk 11' and collar 10' on hub 10, resulting in the arrangement shown in Figs. 3 and 4. As shown in Fig. 3, the portion 14' of plate 13' forms a recess for receiving the projecting inner portion of plate 12, bringing the outer portion 15' into proximity with the outer portion of conical surface 16, to accommodate a belt therebetween. As shown in Figs. 3 and 4, this arrangement provides for an effective diameter variation ranging between the maximum of Fig. 3 and the intermediate value illustrated in Fig. 4, which latter may be substantially the same as that of Fig. 1.

It will be seen that the sheave illustrated herein makes it possible to obtain a very large effective diameter variation by the utilization of only two disks, one of which is reversible with respect to the other. While the only surfaces actually cooperating with the belt are the conical surface 12, the inner portion of surface 12' and surface 15' (so that surface 14, 14', 15 and the outer portion of surface 12' may be of any desired configuration), the construction illustrated has the advantage that the sheave comprises only two sets of identical plates 12, 12' and 13, 13', thereby greatly reducing the expense of manufacture.

At the same time a simple but rugged structure results.

While a sheave having only one V-belt groove has been illustrated and described, it is obvious that the same structure may be utilized for sheaves having two or more grooves.

Various modifications within the spirit of this invention and included in the scope of the claims appended hereto will readily occur to those skilled in the art.

It is claimed and desired to secure by Letters Patent:

1. A variable diameter sheave comprising a fixed disk provided with a continuous conical surface having inner and outer annular portions, a second disk movable axially with respect to said first disk, said second disk being provided on one face with a continuous conical surface for cooperating with said inner portion of the conical surface of said first disk, and said second disk being provided on the opposite face thereof with a continuous conical surface for cooperating with and coextensive only with said outer portion of the conical surface of said first disk.

2. A variable diameter sheave as defined in claim 1, said second disk being provided with a recess at the middle of said opposite face coextensive with said inner portion of said conical surface of said first disk, to accommodate the inner portion of the face of said first disk.

3. A variable diameter sheave as defined in claim 1, said second disk being provided with a recess at the middle of said opposite face coextensive with said inner portion of said conical surface of said first disk to accommodate the inner portion of the face of said first disk, and both of said disks being substantially identical.

4. A variable diameter sheave comprising one disk having a belt-coacting continuous conical surface extending from the periphery thereof inward, and a second disk having on one face thereof a continuous conical surface coextensive with only an outer portion of said first named conical surface and having on the opposite face thereof a continuous conical surface coextensive with at least an inner portion of said first named conical surface 5. A variable diameter sheave as defined in claim 4, said second disk being provided with a recess on its first named face inwardly of the conical surface of said face to receive the inner portion of the conical surface of said first disk.

6. A variable diameter sheave as defined in claim 4, and means for adjustably and reversibly mounting said second disk with respect to said first disk.

7. A variable diameter sheave comprising a hub, a disk provided with a continuous conical surface fixed on said hub, a second disk provided with continuous conical surfaces on opposite sides thereof, one of said conical surfaces being coextensive with only an outer portion of said first named conical surface and the other of said conical surfaces being coextensive with at least an inner portion of said first named conical surface, a recess provided in said second disk within the first of said conical surfaces and coextensive with said inner surface, and means for adjustably and reversibly mounting said second disk on said hub.

8. A variable diameter sheave comprising two relatively adjustable disks, each disk comprising a central support, a first plate fixed on said support and extending therefrom axially and radially outward and then axially inward and radially outward to the periphery thereof, and a second plate abutting said first plate at the support and extending substantially cylindrically therefrom away from said first plate and then extending conically from said cylindrical portion to the periphery of said first plate.

9. A variable diameter sheave as defined in claim 8, said disks being of substantially identical configuration.

10. A variable diameter sheave as defined in claim 8, said support for said first disk comprising a hub and said support for said second disk comprising a collar, and means for adjustably and reversibly mounting said collar and second disk on said hub.

11. A variable diameter sheave comprising a hub, a disk mounted on said hub and provided with a continuous conical surface extending from adjacent the hub to the periphery of said disk, a second disk adapted to be adjustably and reversibly mounted on said hub, said second disk being provided on one face thereof with a continuous conical surface extending outward from adjacent the hub and on the other face thereof with a continuous conical surface extending inwardly from the periphery to a point intermediate said periphery and said hub, and a recess inwardly of said last named conical surface for receiving the central portion of the conical surface of said first disk.

WALTER A. MEYER.